United States Patent
Fuglestad (10) Patent No.: US 11,466,527 B2
(45) Date of Patent: Oct. 11, 2022

(54) PIPELINE PULLING TOOL AND A METHOD OF ACTUATING SUCH A TOOL

(71) Applicant: Well Conveyor AS, Bryne (NO)

(72) Inventor: Kenneth Fuglestad, Bryne (NO)

(73) Assignee: Well Conveyor AS

( * ) Notice: Subject to any disclaimer, the term of this patent is extended or adjusted under 35 U.S.C. 154(b) by 0 days.

(21) Appl. No.: 17/253,544

(22) PCT Filed: Jun. 19, 2019

(86) PCT No.: PCT/NO2019/050127
§ 371 (c)(1),
(2) Date: Dec. 17, 2020

(87) PCT Pub. No.: WO2019/245381
PCT Pub. Date: Dec. 26, 2019

(65) Prior Publication Data
US 2021/0140253 A1    May 13, 2021

(30) Foreign Application Priority Data

Jun. 19, 2018 (NO) .................................. 20180852

(51) Int. Cl.
*E21B 23/00* (2006.01)
*E21B 17/10* (2006.01)
*E21B 23/14* (2006.01)

(52) U.S. Cl.
CPC ........ *E21B 23/001* (2020.05); *E21B 17/1057* (2013.01); *E21B 23/14* (2013.01)

(58) Field of Classification Search
CPC ..... E21B 23/001; E21B 23/14; E21B 17/1057
See application file for complete search history.

(56) References Cited

U.S. PATENT DOCUMENTS

| 4,793,412 A | 12/1988 | Rivas |
| 4,793,415 A | 12/1988 | Holmes |

(Continued)

FOREIGN PATENT DOCUMENTS

| GB | 894117 | 4/1962 |
| WO | 02/070943 | 9/2002 |

(Continued)

OTHER PUBLICATIONS

International Search Report PCT/NO2019/0501247 dated Oct. 22, 2019 (4 Pages).

(Continued)

*Primary Examiner* — David Carroll
(74) *Attorney, Agent, or Firm* — Conley Rose, P.C.

(57) ABSTRACT

Disclosed is a pipeline pulling tool having an elongate housing. First and second roller wheel sections have at least two freely rotating roller wheels extending out from a sidewall of the housing. An attachment for a tool string is fixed to one of the roller wheel sections. A main section with a retractable propulsion wheel and at least one actuator for actuating the propulsion wheel between an extended position, out from the sidewall of the housing, and a retracted position, inside the housing, is located between the first roller wheel section and the second roller wheel section. A method of actuating a pipeline pulling tool is also disclosed.

20 Claims, 4 Drawing Sheets

(56) References Cited

U.S. PATENT DOCUMENTS

| | | | | |
|---|---|---|---|---|
| 2005/0145415 A1* | 7/2005 | Doering | ............... | E21B 4/18 |
| | | | | 175/24 |
| 2015/0083437 A1* | 3/2015 | Gourmelon | ......... | E21B 17/1078 |
| | | | | 166/381 |
| 2015/0300113 A1* | 10/2015 | Guttormsen | ............. | E21B 4/18 |
| | | | | 166/65.1 |
| 2018/0363397 A1* | 12/2018 | Ratcliffe | ................ | E21B 23/00 |
| 2019/0040698 A1* | 2/2019 | Fuglestad | ................ | E21B 4/18 |

FOREIGN PATENT DOCUMENTS

| WO | 0046481 | 8/2008 |
|---|---|---|
| WO | 2017059539 | 4/2017 |
| WO | 2017/119823 | 7/2017 |

OTHER PUBLICATIONS

Written Opinion for PCT/NO2019/0501247 dated Oct. 22, 2019 (8 pages).
NIPO report for NO 20180852 dated Jan. 16, 2019 (2 Pages).

* cited by examiner

PIPELINE PULLING TOOL AND A METHOD OF ACTUATING SUCH A TOOL

CROSS REFERENCE TO RELATED APPLICATIONS

This application is a 35 U.S.C. § 371 national stage application of PCT/NO2019/050127 filed Jun. 19, 2019 and entitled "Pipeline Pulling Tool and a Method of Actuating such a Tool," which claims priority to Norwegian Application No. 20180852 filed Jun. 19, 2018, each of which is incorporated herein by reference in their entirety for all purposes.

STATEMENT REGARDING FEDERALLY SPONSORED RESEARCH OR DEVELOPMENT

Not applicable.

Field of Disclosure

This present disclosure relates to a pulling tool used for pulling itself and other equipment into wellbores and pipelines and a method of actuating such a pipeline pulling tool.

Background of the Disclosure

Wellbores and pipelines typically include long vertical and horizontal runs. In many wells there is a need for installing a fibre optic cable in order to obtain real-time measurements of flow, pressure, and temperature, among other things. In itself, a fibre optic cable is very thin and weak. Therefore, several types of claddings are used for protecting the fibre optic cable, such as metal, Kevlar, or carbon rods. Common to these cables are that they are very lightweight and a bit flexible, which present some challenges when they are to be installed in horizontal wells. Other elements that may be run into or out of wellbores and pipelines include cables, pipes, downhole packers, perforating guns, logging tools, bridge plugs, fibre optic cable, slick line, signal cables and other equipment used in a pipe or well.

When the pulling tool is to pull a fibre optic cable, the pulling tool must be battery operated because a fibre optic cable is a signal cable only and does not carry electrical power. Therefore, it is essential that the pulling tool is as efficient and lightweight as possible to limit the necessary power consumption.

There is a need for a pulling tool for light well interventions that is able to pull slick line. Similarly to the case of a fibre optic cable, the same challenges are encountered when it comes to being able to run a slick line into horizontal wells. Due to the limited rigidity of the slick line, it is not possible to push it very far into horizontal wells.

Wells in which there is a need for running light well interventions may have small internal diameters and include nipple profiles as small as 43 mm. It is necessary, therefore, to construct the pulling tool small enough to be able to pass through the smallest nipple profiles. The diameter of the well may be larger than the combined diameters of the pulling tool and the cable to be pulled by the pulling tool.

Several variants of pulling tools or well tractors are available in the market. A known solution includes an electric motor driving a hydraulic pump which in turn drives a hydraulic motor of the propulsion wheel. Such a system is technically complex and not very efficient. Other variants available use an electric motor that transfers the rotation directly by way of an angular gear and on to the wheel either by way of chain/belt drive or straight gears.

It is often needed to perform intervention activities in curved and horizontal wellbores and pipelines. In many cases it is desired to use wireline or slick line to carry out such operations. Thus, it is necessary to rely on gravity to get into vertical and curved wells. In order to reduce the friction against the wellbore wall and thereby be able to reach further in from vertical into curved wells, use is frequently made of friction-reducing roller wheel sections mounted on the tool string and rolling on the wellbore wall. Exemplary tool strings run on wireline or slick line are tools for logging operations, tools for installing plugs, or perforating guns.

However, even when friction-reducing roller wheel sections are used, it is limited how far into the well it is possible to reach by way of gravity.

It is therefore needed to install a section of a pulling tool in the tool string in order to be able to get further into curved and horizontal wells without substantially increasing the complexity.

Several variants of pulling tools or well tractors are available in the market, but those known are electric variants that depend on current-carrying cable. Thus, more personnel and equipment are required in order to run such operations and the whole operation becomes more expensive.

SUMMARY OF THE DISCLOSURE

Accordingly, disclosed herein is a robust and efficient propulsion system in which one pulling tool can be efficiently and easily mounted between two friction-reducing roller wheel sections in tool strings in order to reach further in from vertical into curved and horizontal wells.

As rolling wheels of friction-reducing roller sections are already available, the arrangement can be fitted with at least one propulsion wheel in a radial direction of the tool string. Through embodiments disclosed herein, existing tool string solutions can be pulled further into the well in case of curved and horizontal wells.

Certain embodiments comprise a pulling tool having a tilting arm and a propulsion wheel, a battery section, an electronics control module, and a spring-loaded arm with counting wheels. The pulling tool comprises at least one propulsion arm.

Certain embodiments allow the creation of a pulling tool which is smaller in diameter than the pulling tools existing in the market today.

Certain embodiments yield a small-sized, lightweight, high performance propulsion unit which is preferably powered by batteries.

Hence, the pulling tool with the propulsion section is mounted between two friction-reducing roller wheel sections. The pulling tool with the propulsion section is actuated as required based on given parameters.

In several cases during operations as described above a cable without a current-carrying conductor is involved, making it necessary to rely on a battery-operated pulling tool mounted in the tool string.

Disclosed herein is a slick line, signal cable and/or fibre optic cable pulling wellbore and/or pipeline pulling tool including a propulsion module having a main section. A propulsion arm is hinged to the main section. The propulsion arm has a propulsion wheel. An electric motor for driving the propulsion wheel via a gear system is located in a hinged propulsion arm. In the present context, a slick line may also be an electric cable.

The pulling tool may further comprise a cable transition, a battery module including one or more batteries for powering the electric motor, an electronics module and at least one propulsion module.

The electric motor may be a brushless motor having a longitudinal axis perpendicular to a rotation axis of the propulsion wheel, and the pulling tool may further comprise a controller for the brushless motor.

An electric actuator can be provided between the main section and the hinged propulsion arm, whereby the hinged propulsion arm is configured for assuming a first retracted position inside the propulsion module and a second actuated position against a wellbore or pipeline wall.

The pulling tool may have an external diameter of less than 42 mm.

The disclosure further comprises a propulsion module of a pulling tool having a main section and a propulsion arm hinged to the main section, the propulsion arm having a propulsion wheel with a gear system.

The pulling tool further comprises a controller for the brushless motor.

Hence, certain embodiments comprise a pipeline pulling tool having an elongate housing. The pulling tool comprises a first roller wheel section having at least two freely rotating roller wheels extending out from a sidewall of the housing.

A second roller wheel section has at least two freely rotating roller wheels extending out from a sidewall of the housing. A main section has a retractable propulsion wheel and at least one actuator for actuating the propulsion wheel between an extended position out from the sidewall of the housing and a retracted position inside the housing. The main section is located between the first roller wheel section and the second roller wheel section.

The pipeline pulling tool may further comprise a counting wheel section having a freely rotating counting wheel connected to a counter, supported in a rotatably supported tilting arm.

The pipeline pulling tool may comprise an attachment for a tool string in the second roller wheel section.

The propulsion wheel may be driven by an electric motor, with the pipeline pulling tool further comprising a battery section for powering the electric motor.

The pipeline pulling tool may further comprise an electronic control module including sensors.

The sensors may include sensors for measuring, for example, ambient conditions such as pressure, temperature, acceleration, flow, pipeline perforation, transitions between pipe sections, surface nature, inclination, acoustics/sound, tool string tension, and fluid parameters.

The electronic control module may control the advancement of the propulsion wheel.

The pipeline pulling tool may further comprise a pressure equalization module. The pressure equalization module comprises a unit for compensating volume changes of oil internally in the housing surrounding the pulling tool. The oil prevents water penetration. The volume changes are typically caused by temperature changes changing the density of the oil and the volumes of the housings.

All sections may be elongate and tubular.

Each of the first and second roller wheel sections may include four freely rotating roller wheels having rotation axes offset 45° relative to each other.

The first roller wheel section and the second roller wheel section may each include a separate cylindrical housing having a first diameter and the freely rotating roller wheels may have a diameter that is larger than the diameter of the cylindrical housing, with the freely rotating roller wheels extending through the cylindrical housings.

The housing may be divided for each section and each section may form a module so that each module constitutes a separate part which may be attached to an adjacent module.

A tool string may be attached to the first roller wheel section, followed by the counting wheel section with a free-wheeling counting wheel, followed by a pressure equalization section, followed by the main section with the propulsion wheel, followed by a control module, followed by a battery section, followed by the second roller wheel section.

In one embodiment, only one retractable propulsion wheel is located between the first roller wheel section and the second roller wheel section.

Each roller wheel may be supported by an axle and the axles of all roller wheels may be parallel, and the propulsion wheel and all roller wheels may be situated in the same plane.

Each of the first roller wheel section and second roller wheel section may include two wheels.

The main section with the propulsion wheel may be attached directly to the second roller wheel section.

Also disclosed herein is a method of actuating a pipeline pulling tool as described above, wherein the main section of the pipeline pulling tool having a retractable propulsion wheel is put into operation without any control signals from a communication cable.

The method may further include putting the main section having a retractable propulsion wheel into operation on the basis of a timing unit or a parameter measured by one or more of an inclination sensor, a tool tension sensor, a sensor of a counting wheel section with a freely rotating counting wheel, an acceleration sensor, a pressure sensor, or a sensor recording internal geometry of the pipeline

DETAILED DESCRIPTION OF THE DISCLOSED EXEMPLARY EMBODIMENTS

Exemplary embodiments will now be explained in more detail with reference to the drawings.

FIGS. 1-4 show a pulling tool according to the disclosure in different positions, inside and outside a downhole pipe or wellbore. The solution itself is the same in all drawings, so all reference numerals are applicable to all drawings except for the downhole pipe, which is not shown in FIGS. 1, 2.

Figure 1:
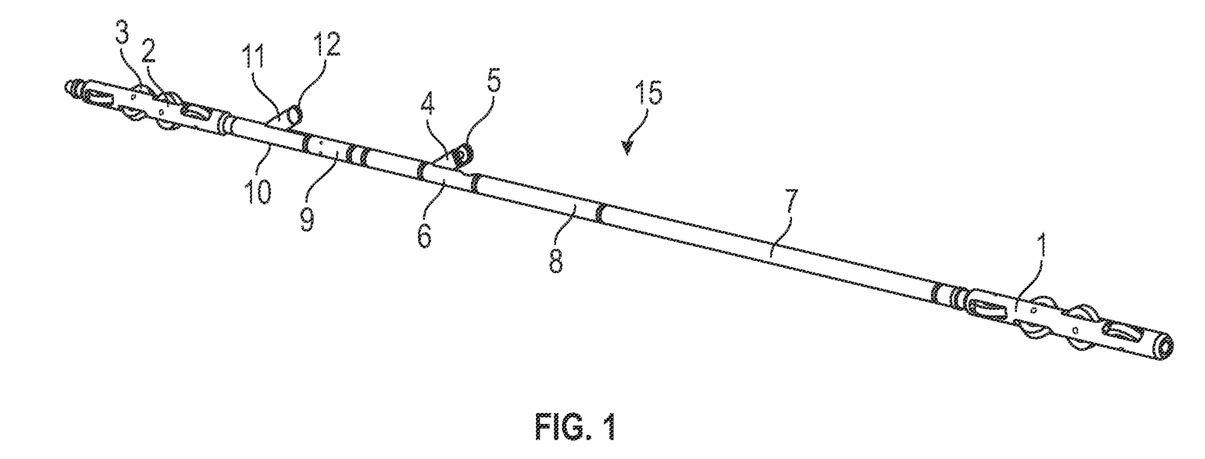
FIG. 1 shows a perspective view of an embodiment of a pulling tool assembled with friction-reducing roller wheel sections and in which the propulsion arm has been actuated.

FIG. 1 shows a perspective view of an embodiment of a pulling tool made in accordance with the present disclosure. The pulling tool comprises a main section 6 having a propulsion wheel 5 mounted on a tilting arm 4 mounted between a first and a second friction-reducing roller wheel section 1, 2 with roller wheels 3. Roller wheels 3 extend through and are supported by an elongate housing 15 that is part of a tool string and is divided into a plurality of section housings. Each roller wheel section 1, 2 is shown having four said wheels 3 supported so as to rotate about four rotation axes spaced 45° apart. Hence, each wheel has a diameter that is larger than the diameter of the tool string. Said two roller wheel sections may be separated into a front roller wheel section 1 and a rear roller wheel section 2.

Typically, the different sections or parts may be constructed as separate modules that can be assembled and disassembled as required. Each section typically comprises an elongate outer tubular section housing having an external diameter that is smaller than the diameter of the pipe or bore in which the pulling tool is to be used. In a particular embodiment, the diameter of the tool is 42 mm. Each section may have suitable connectors at each end for connection to the adjacent section. The connectors must provide for both mechanical strength as well as any transmissions of electrical power and signals.

Main section 6 having a tilting arm 4 with a propulsion wheel 5 comprises a motor and a gear system for driving the propulsion wheel. Typically, the motor is an electric motor.

The tilting arm may be retracted so that the propulsion wheel is mainly located inside main section 6, and extended so that propulsion wheel 5 is pushed against the wall of a pipe or wellbore. The tilting arm typically functions in such a manner that springing is allowed and that the pressure against the wall of the pipe or wellbore is relatively constant independently of the deflection of the tilting arm. Tilting arm 4 is tiltable from main section 6.

The pulling tool further comprises a battery section 7, an electronic control module 8, a pressure equalization module 9, and a counting wheel module 10.

Counting wheel module 10 comprise a tilting arm 11 with a rotating counting wheel 12 that is pressed against the pipe or wellbore wall to provide information on the positioning of the tool in the well. Tilting arm 11 is spring-loaded and flexible so that it is automatically adjusted according to the size of the hole in which the pulling tool runs. Said rotating counting wheel 12 is provided with a counting function that counts the number of revolutions, which is converted to a distance measurement by the electronic control module 8.

Electronic control module 8 may contain a Casing Collar Locator (CCL) for depth control, a pressure sensor, an accelerometer, a temperature sensor and a time delay function. Electronic control module 8 may also include a controller for the motor of the main section.

Tilting arm 4 with propulsion wheel 5 can be actuated in several different ways. For example, by means of distance measurements from counting wheel module 10 and CCL, tilting arm 4 with propulsion wheel 5 can be actuated after a pre-programmed distance. It is also possible to use a time delay function in that the pulling tool is actuated after a pre-programmed time. Another alternative is to actuate the pulling tool using the accelerometer. In this case, the cable can be pulled a given number of times pre-programmed for the pulling tool to be actuated.

Thus, the pulling tool may run for a pre-programmed length that is measured by means of counting wheel module 10 and CCL before propulsion wheel 5 is stopped and tilting arm 4 is tilted in so that it is oriented with the same axial direction as main section 6.

Normally, the number of casing collars present in the well is known. The pulling tool, therefore, can detect the number of casing collars it passes through on its way into the well before the pulling tool is actuated. Thereafter the pulling tool can be actuated and run for a length and pass through a pre-programmed number of casing collars before the pulling tool is stopped and de-actuated.

Figure 2:
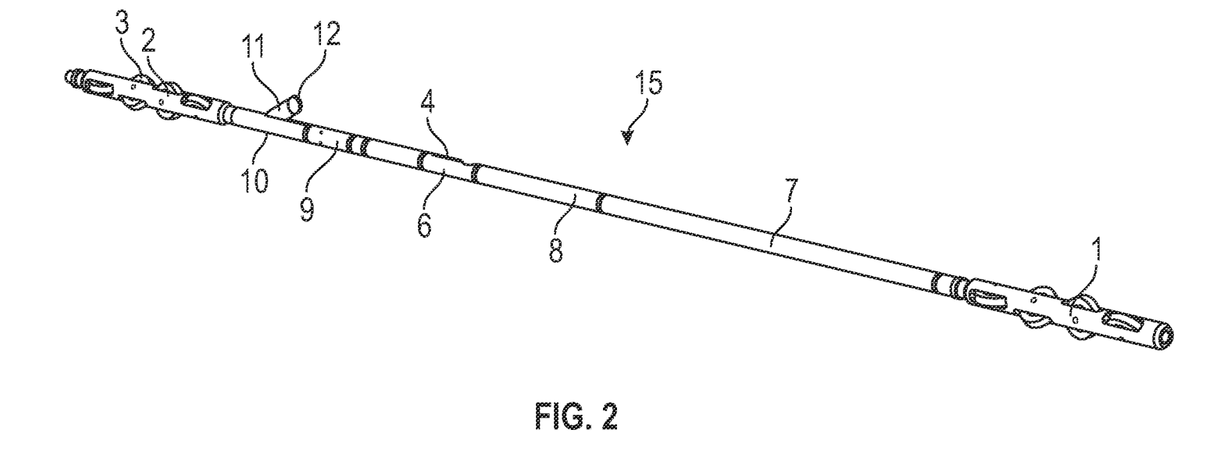
FIG. 2 shows a perspective view of an embodiment of a pulling tool assembled with friction-reducing roller wheel sections and in which the propulsion arm has not been actuated.

FIG. 2 shows a perspective view of an exemplary embodiment of the pulling tool in which tilting arm 4 with propulsion wheel 5 has not been actuated and is extended in the same axial direction as main section 6.

Figure 3:
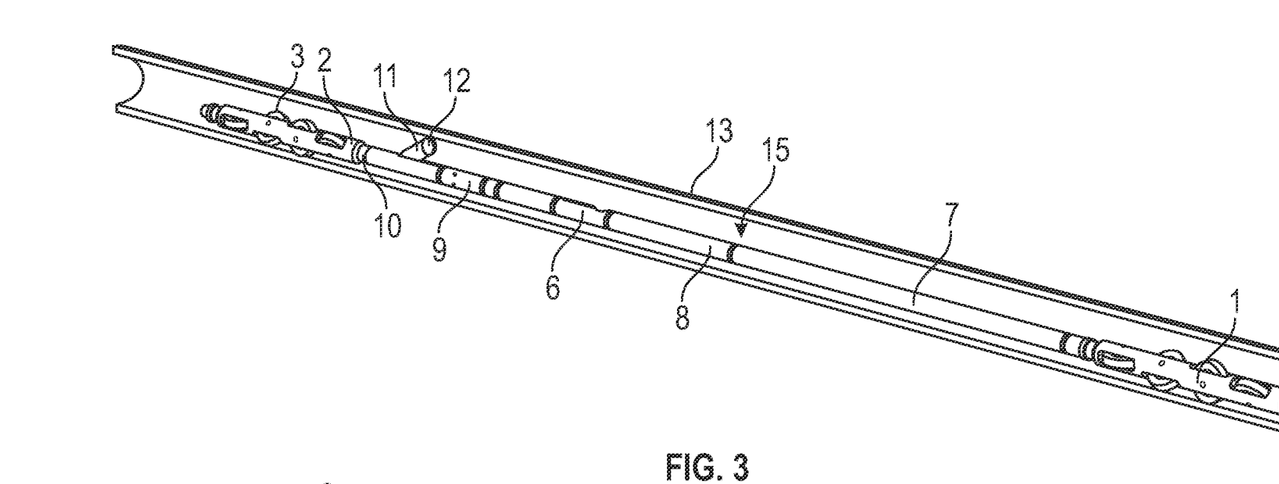
FIG. 3 shows a perspective view of an embodiment of a pulling tool assembled with friction-reducing roller wheel sections in which the propulsion arm has not been actuated, with the embodiment being shown inside a pipe.

FIG. 3 shows the pulling tool according to the disclosure inside a downhole pipe 13 in a configuration for being run into the well before propulsion arm 4 is actuated.

Figure 4:
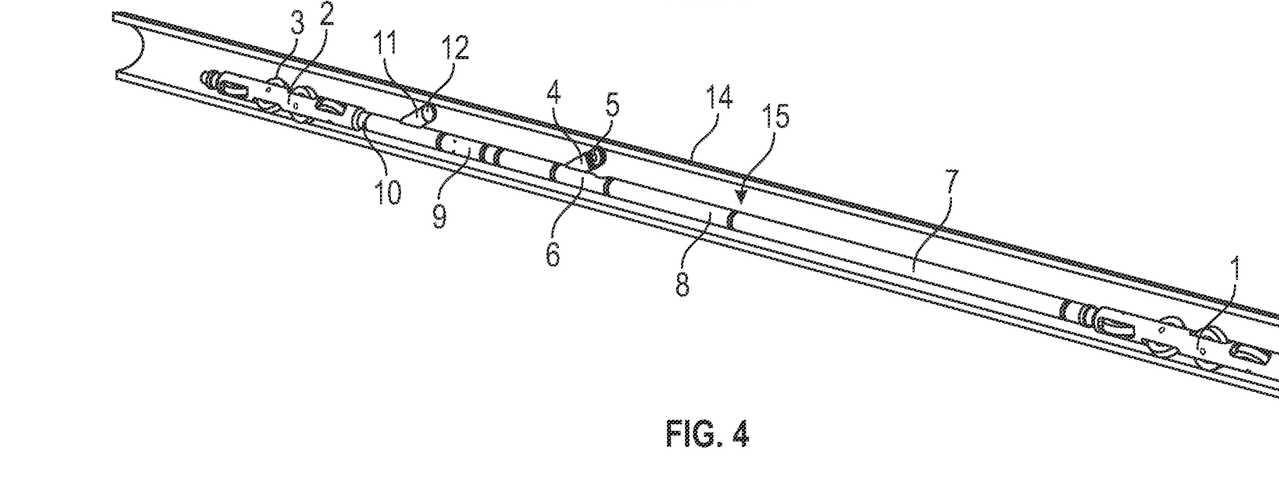
FIG. 4 shows a perspective view of an embodiment of a pulling tool assembled with friction-reducing roller wheel sections in which the propulsion arm has been actuated, with the embodiment being shown inside a pipe.

FIG. 4 shows the pulling tool inside a downhole pipe 13 in a configuration in which tilting arm 4 with propulsion wheel 5 has been actuated. Propulsion wheel 5 is driven in rotation by an electric motor in the main section 6 which is provided with electrical power from battery section 7. When propulsion wheel 5 is driven and abuts against the wellbore wall 14 with a tensioning force the pulling tool will advance the tool string inwardly in downhole pipe 13.

Figure 5:
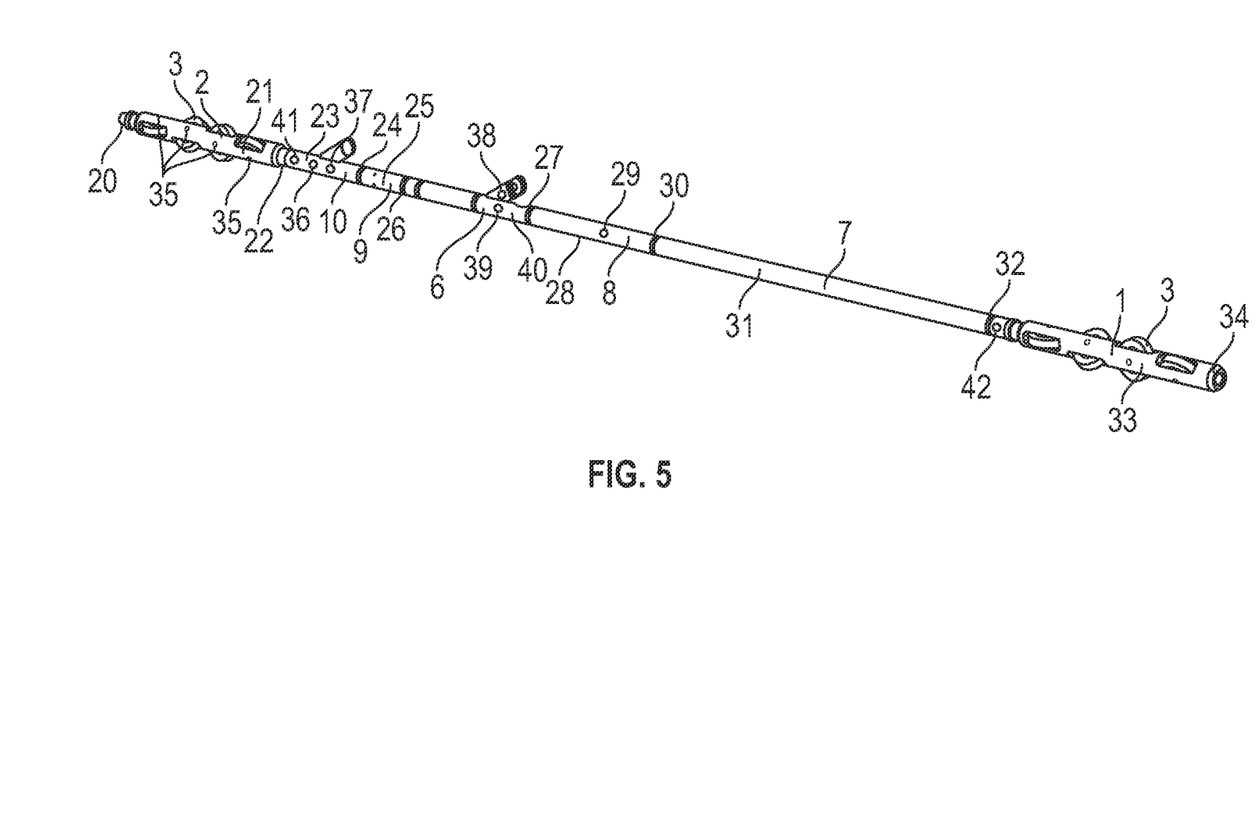
FIG. 5 shows a perspective view of a pulling tool in which further components can be seen.

FIG. 5 shows further details of the pulling tool shown in FIGS. 1-4. A tool string 20 is attached to an end of roller section housing 21 of the elongate housing 15 at which said four roller wheels are supported by four shafts 35 offset 45° relative to each other. A releasable coupling 22 fastens roller section housing 21 with the counting wheel section to the counting wheel section housing 23 of the elongate housing 15. A revolution sensor 37 of the counting wheel section counts the number of revolutions made by the counting wheel. An elastic unit 36 biases the counting wheel towards an outer position. A releasable coupling 24 fastens counting wheel section housing 23 with the pressure equalization module to pressure equalization module housing 25 of the elongate housing 15. A coupling 26 fastens pressure equalization module housing 25 with the main section to a main section housing 40 of the elongate housing 15. A motor 38 for driving the propulsion wheel and an actuator 39 for pressing the propulsion wheel against a wall are located in main section housing 40. A coupling 27 fastens main section housing 40 with the control module to a control module housing 28 of the elongate housing 15. Sensors 29 of control module housing 28 measures desired parameters. Sensors 29 may include pressure sensor, temperature sensor, gyroscope, inclinometer, accelerometer, various sensors such as fluid parameters, flow sensors, acoustic sensors, etc. A releasable coupling 30 connects control module housing 28 to a battery section housing 31 of the elongate housing 15. A releasable coupling 32 connects the second roller wheel section with a roller wheel section housing 33 of the elongate housing 15 to battery section housing 31. An end piece 34 is connected to the second end of roller wheel section housing 33. End piece 34 can be made for receiving any impacts with the end of a wellbore or with other elements against which the unit may impact. End piece 34 may also contain sensors. The pulling tool may also be constructed with more or fewer subdivisions, in which case the number of releasable couplings will vary. The housing may also be constructed in one piece. A first tension sensor 41 in the counting wheel section measures the tensile/compressive force in tool string 20 (on the rear roller wheel section) and a second tension sensor 42 of the battery section measures tensile/compressive force on the front roller wheel section. Tensile/compressive force on the front roller wheel section may be used for measuring whether the pipeline pulling tool impacts with something or for measuring resistance against movement applied by a string or tool mounted to the pipeline pulling tool.

Alternatively, the second end of roller wheel section housing 33 may comprise an attachment for tools or a tool string, and one or more pulling tools according to the disclosure may be fastened to each other, with or without the presence of an intermediate string or tool. In this case, the second end of roller wheel section housing 33 will not include end piece 34. Hence, the pulling tool can also be used for pushing equipment or a tool string in front thereof.

During operation in a pipe or bore, such as in an uncased hole, each roller wheel 3 will abut against the wellbore wall. The diameter of roller wheels 3 is smaller than the diameter of the well, and normally all the wheels will not be in contact with the wellbore wall at the same time. As roller wheels 3 extend through the elongate housing of roller wheel section 2, each roller wheel will support the pulling tool on two sides. Only one propulsion wheel 5 is needed because roller wheels 3 will absorb the forces when propulsion wheel 3 is pressed against the wellbore wall as roller wheels 3 are also located both in front of and behind main section 6 with said propulsion wheel 5 that is pressed against the wellbore wall through tilting arm 4.

Operating only one main section 6 having one electric motor driving only one propulsion wheel 5 yields good mechanical efficiency, which is particularly important as the pulling tool is battery operated.

During operation the freely rotating counting wheel 12 of counting wheel section 10 will also be pressed against the wellbore wall by the resilient tilting arm 11. Said rotating counting wheel 12 is connected to a unit that records the rotation of wheel 12 and transmits information to control module 8, which thereby obtains information on the location of the pulling tool in the well. The resilient tilting arm 12 does not need not include any actuator as the freely rotating wheel is to record the location of the tool along the entire length of the well.

If the operation of the propulsion wheel of the main section is not controlled through a cable, the control module may selectively/automatically actuate the pulling tool based on time delay, velocity measured by the counting wheel section, tension in the tool string, parameters from the accelerometer, inclination, etc. In some cases it may be important that the propulsion wheel of the main section is put into operation before the pipeline pulling tool and tool string stop because the friction increases after stoppage and because start-up may then be problematic. The pressure sensor allows instructions to be sent to the electronic control module by way of liquid pulse telemetry in order to instruct start or stoppage of the pulling tool, for example.

Figure 6:
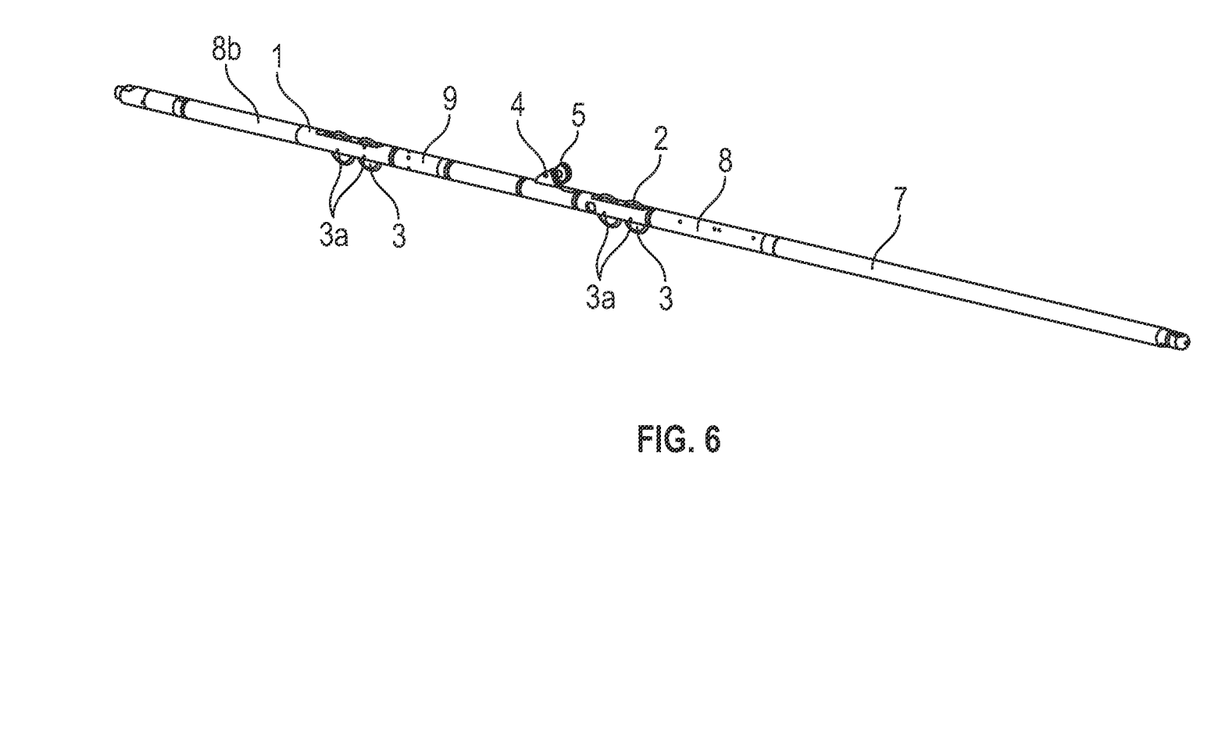
FIG. 6 shows a perspective view of a pulling tool according to an alternative embodiment.

FIG. 6 shows a perspective view of an alternative embodiment of a pulling tool according to the disclosure. The embodiment is similar to the embodiments described above, with some exceptions. The pulling tool includes a main section 6 having a propulsion wheel 5 mounted on a tilting arm 4 mounted between a first and a second friction-reducing roller wheel section 1, 2 with roller wheels 3. Roller wheels 3 extend through and are supported by the first and second roller wheel sections 1, 2. Each roller wheel section 1, 2 is shown having two wheels 3 each supported in a separate axle 3a so that each wheel rotates about its axis of revolution. These axes of revolution/shaft 3a of each wheel are positioned in parallel to each other. The wheels of the first roller wheel section 1 are situated in the same plane as the wheels of the second roller wheel section 2. In other words, all the axes of revolution of the wheels are parallel with each other and situated in the same plane. Each wheel 3 has a diameter that is larger than a diameter of the tool string. As mentioned earlier, the roller wheel sections typically comprise an elongate outer tubular housing having an outer diameter that is smaller than the diameter of the pipe or bore in which the pulling tool is to be used.

The wheel axles extends outside the centre of the tubular housings of roller wheel sections 1, 2 so that each wheel protrudes further out on the one side of roller wheel sections than the other. The wheel axles are located outside the centre of the tubular housing, and are located on the opposite side of the centre of the tubular housing relative to propulsion wheel 5.

The main section 6 having a tilting arm 4 with propulsion wheel 5 is as described in connection with the other embodiments, but propulsion wheel 5 has an axis of revolution that is parallel with the rotation axes of the freely supported roller wheels 3. Roller wheels 3 and propulsion wheel 5 are situated in the same plane, but are positioned on different sides of the respective tubular housings so that a force applied by propulsion wheel 5 to the wellbore or pipe wall is absorbed and distributed between the four roller wheels 3. Thus, this force is perpendicular to all wheel axles, both of the four roller wheels 3 and of propulsion wheel 5.

Further, the second roller wheel section 2 is adjacent to main section 6 with propulsion wheel 5 so that the distance between roller wheels 3 of at least the second roller wheel section 2 and propulsion wheel 5 of the main section 6 is short. This means that the moment applied to the tool housing exerted by propulsion wheel 5 on tilting arm 4 is small so that the deflection of the tubular housing due to propulsion wheel 5 is small.

The pulling tool further comprises the battery section 7, electronic control module 8, and pressure equalization module 9. A «brain» or electronics unit 8b records, stores, and/or processes various data.

As all roller wheels 3 are in line and propulsion wheel 5 is situated in the same plane as roller wheels 3, the pulling tool will seek towards the centre of the pipe/bore in which the tool is deployed as the tool will be located where the pipe/bore diameter is greatest.

The short distance between roller wheels 3 and the propulsion wheel results in only a small deflection of the tubular housing. This prevents the tubular housing from bending and reduces the risk that the tubular housing sweeps internally in the wall of the pipe/bore causing increased resistance and wear. The roller wheels 3 of each section are positioned one behind the other at a close distance, although not so close that the roller wheels 3 contact each other.

In FIG. 6 the first roller wheel section 1 is attached to pressure equalization module 9, which is in turn attached to main section 6 which is in turn attached to the second roller wheel module 2.

In the solution of FIG. 6 all wheels will be positioned so as to absorb the force from the pressing by the propulsion wheel against the wall and to distribute the forces to all four wheels. This allows the number of roller wheels 3 to be reduced without increasing the pressure from the wheels against the surface.

In the patent claims, it is claimed that the pulling tool comprises an attachment for a tool string. In this relation the term «tool string» is intended to include cables, pipes, downhole packers, perforating guns, logging tools, bridge plugs, fibre optic cable, slick line, signal cable as well as other equipment being used in a pipe or well. Hence, the claim is not intended to be limited based on what is to be pulled or pushed by the pulling tool. Similarly, the end piece 34 can be replaced by a «tool string» as defined above.

Also, in the patent claims the term «pipeline pulling tool» is intended to include a tool that may also be used in uncased bores in wells or in other bores, and thus the claimed «pipeline pulling tool» is not limited to a pulling tool for use only in pipelines or in other tubular members.

In the description set out above a particular order of parts and sections is indicated. It is important that the main section is located between the roller wheel sections. However, the ordering of the remaining sections can be changed without departing from the disclosure. When it is described that the main section is located between the roller wheel sections, this is not intended to exclude the possibility that further sections are located between the roller wheel sections as well but is only intended to describe that a roller wheel section is present ahead of the main section and a roller wheel section is present behind the main section. However, it is important that a certain rigidity is ensured between the roller wheel sections.

The distance between the roller wheel sections and the rigidity of the pulling tool are chosen so that the tilting arm with a propulsion wheel does not bend the pulling tool causing the pulling tool to contact the wall of the pipeline or bore in which the pulling tool is deployed. In other words, the pulling tool possesses a rigidity between the roller wheel sections that prevents the main section from pressing other parts than the roller wheels against the pipeline or bore.

The invention claimed is:

1. A pipeline pulling tool comprising:
   an elongate housing divided into separate section housings;
   a first roller wheel section having at least two freely rotating roller wheels extending out from a sidewall of a first roller section housing of the elongate housing;
   a second roller wheel section having at least two freely rotating roller wheels extending out from a sidewall of a separate second roller section housing of the elongate housing;
   wherein both of the first roller section housing and the second roller housing is cylindrical and includes a first diameter and wherein the at least two freely rotating roller wheels of both the first roller wheel section and the second roller wheel section have a diameter that is larger than the first diameter; and
   a main section having only one tilting arm with a retractable propulsion wheel and at least one actuator configured to actuate the propulsion wheel between an extended position extending out from a sidewall of a separate main section housing of the elongate housing and a retracted position inside the main section housing, the main section being located between the first roller wheel section and the second roller wheel section.

2. The pipeline pulling tool of claim 1, further comprising a counting wheel section having a freely rotating counting wheel connected to a counter, supported in a rotatably supported tilting arm.

3. The pipeline pulling tool of claim 1, wherein the propulsion wheel is driven by an electric motor, the pipeline pulling tool further comprising a battery section for powering the electric motor.

4. The pipeline pulling tool of claim 1, further comprising an electronic control module with sensors.

5. The pipeline pulling tool of claim 4, wherein the sensors sense a parameter selected from the group consisting of pressure, temperature, acceleration, flow, pipeline perforation, transitions between pipe sections, surface nature, flow conditions, inclination, acoustics/sound, and tool string tension.

6. The pipeline pulling tool of claim 4, wherein the electronic control module controls the advancement of the propulsion wheel.

7. A method of actuating a pipeline pulling tool as defined in claim 4, wherein the main section with a retractable propulsion wheel is put into operation without any control signals from a communication cable.

8. The method of claim 7, wherein the main section with a retractable propulsion wheel is put into operation on the basis of a timing unit or a parameter measured by one or more of an inclination sensor, a tool tension sensor, a sensor of a counting wheel section with a freely rotating counting wheel, an acceleration sensor, a pressure sensor, or a sensor recording internal geometry of the pipeline.

9. The pipeline pulling tool of claim 1, further comprising a pressure equalization module.

10. The pipeline pulling tool of claim 1, wherein all of the separate section housings of the elongate housing are elongate and cylindrical.

11. The pipeline pulling tool of claim 1, wherein the first and second roller wheel sections each has four freely rotating roller wheels with rotation axes offset 45° relative to each other.

12. The pipeline pulling tool of claim 1, wherein the elongate housing is divided for each of the separate section housings and thereby forms a plurality of separate modules so that each module of the plurality of separate modules constitutes a separate part which can be attached to an adjacent module of the plurality of separate modules.

13. The pipeline pulling tool of claim 1, further comprising an attachment for a tool string at the second roller wheel section.

14. The pipeline pulling tool of claim 1, wherein a tool string is attached to the first roller wheel section, followed by the counting wheel section with a freely running counting wheel, followed by a pressure equalization section, followed by the main section with the propulsion wheel, followed by a control module, followed by a battery section, followed by the second roller wheel section.

15. The pipeline pulling tool of claim 14, wherein each roller wheel is supported by an axle, wherein all the axles of the roller wheels are parallel and wherein the propulsion wheel and all roller wheels are situated in the same plane.

16. The pipeline pulling tool of claim 15, wherein the main section with the propulsion wheel is directly attached to the second roller wheel section.

17. The pipeline pulling tool of claim 14, wherein the first roller wheel section and the second roller wheel section each has two wheels.

18. The pipeline pulling tool of claim 1, wherein the distance between the roller wheel sections and the rigidity of the pipeline pulling tool are such that the tilting arm with the propulsion wheel does not bend the pipeline pulling tool and such that the pipeline pulling tool contacts the wall of a pipeline or wellbore in which the pulling tool is deployed.

19. The pipeline pulling tool of claim 18, further comprising a counting wheel section having a freely rotating counting wheel connected to a counter, supported in a rotatably supported tilting arm.

20. The pipeline pulling tool of claim 18, wherein the propulsion wheel is driven by an electric motor, the pipeline pulling tool further comprising a battery section for powering the electric motor.

* * * * *